United States Patent
Chen et al.

(10) Patent No.: US 9,274,614 B2
(45) Date of Patent: Mar. 1, 2016

(54) OPTICAL MOUSE APPARATUS BASED ON IMAGE VARIATION AND RELATED METHOD THEREOF

(71) Applicant: PixArt Imaging Inc., Hsin-Chu (TW)

(72) Inventors: Chun-Wei Chen, Hsin-Chu (TW); Yen-Chang Wang, Hsin-Chu (TW)

(73) Assignee: PixArt Imaging Inc., Science-Based Industrial Park, Hsin-Chu (TW)

(*) Notice: Subject to any disclaimer, the term of this patent is extended or adjusted under 35 U.S.C. 154(b) by 76 days.

(21) Appl. No.: 13/890,261

(22) Filed: May 9, 2013

(65) Prior Publication Data

US 2014/0191971 A1 Jul. 10, 2014

(30) Foreign Application Priority Data

Jan. 4, 2013 (TW) .............................. 102100325 A

(51) Int. Cl.
*G06F 3/033* (2013.01)
*G06F 3/03* (2006.01)

(52) U.S. Cl.
CPC ..................................... *G06F 3/0317* (2013.01)

(58) Field of Classification Search
CPC .......... G01S 3/781–3/784; G09G 5/08; G09G 5/03543; G06F 3/033; G06F 3/038; G01B 11/22
USPC ................................. 345/166, 156; 205/206.1
See application file for complete search history.

(56) References Cited

U.S. PATENT DOCUMENTS

| 2006/0125794 A1* | 6/2006 | Afriat ........................... 345/166 |
| 2006/0232696 A1* | 10/2006 | Ito et al. ......................... 348/345 |
| 2008/0030458 A1* | 2/2008 | Helbing et al. ............... 345/156 |
| 2008/0106635 A1* | 5/2008 | Lin et al. ....................... 348/362 |
| 2009/0135140 A1* | 5/2009 | Constantin et al. ........... 345/166 |
| 2012/0038554 A1* | 2/2012 | Wu et al. ....................... 345/166 |

FOREIGN PATENT DOCUMENTS

| TW | 201005595 | 2/2010 |
| TW | 201202652 | 1/2012 |

* cited by examiner

*Primary Examiner* — Kent Chang
*Assistant Examiner* — Mark Edwards
(74) *Attorney, Agent, or Firm* — Winston Hsu; Scott Margo

(57) ABSTRACT

An optical mouse apparatus includes a light source unit, a sensing unit, and a processing unit. The light source unit is arranged for generating and emitting an optical signal, wherein the optical signal is emitted upon a surface, and then reflected to form an optical reflected signal. The sensing unit is arranged for generating a sensed image output according to the optical reflected signal, wherein the sensed image output is utilized for estimating an image displacement of the optical mouse apparatus. The processing unit is coupled to the light source unit and the sensing unit, and arranged for controlling the light source unit to emit the optical signal and determining a operation status of the optical mouse apparatus according to an image variation of at least a partial region of each of consecutive images of the sensed image output.

20 Claims, 4 Drawing Sheets

OPTICAL MOUSE APPARATUS BASED ON IMAGE VARIATION AND RELATED METHOD THEREOF

BACKGROUND OF THE INVENTION

1. Field of the Invention

The disclosed embodiments of the present invention relate to an optical mouse mechanism, and more particularly, to an optical mouse apparatus and a method utilized for an optical mouse apparatus.

2. Description of the Prior Art

Generally speaking, the existing optical mouse has a photosensitive element which is used for obtaining multiple sensed images, and obtains the information of the displacement detection according to correlations between the multiple sensed images. However, the existing optical mouse does not have a mechanism for detecting if it is lifted up or not. Although the existing optical mouse could detect the poor image quality of the sensed image through the sensing unit while being lifted up, the deterioration of the image quality of the sensed image happens not merely because the optical mouse is lifted up. The image quality of the sensed image also becomes poorer when the optical mouse is operated on a slightly rough surface. Therefore, the existing optical mouse is not able to correctly determine or detect whether it is lifted up or just operated on a slightly rough surface. Besides, if the optical mouse can not determine the exact time at which it is lifted up, the jitter of the mouse cursor on the screen will be exacerbated.

SUMMARY OF THE INVENTION

Therefore, one of the objectives of the present invention is to provide an optical mouse apparatus and a method utilized for an optical mouse apparatus, for correctly determining/detecting whether the optical mouse apparatus is lifted up or is merely operated on a slightly rough surface, thereby mitigating or eliminating jitter of the mouse cursor on the display and accordingly solving the problem of the prior art.

According to a first embodiment of the present invention, an optical mouse apparatus is disclosed. The optical mouse apparatus includes a light source unit, a sensing unit, and a processing unit. The light source unit is arranged for generating and emitting an optical signal, wherein the optical signal is emitted upon a surface, and then reflected to form an optical reflected signal. The sensing unit is arranged for generating a sensed image output according to the optical reflected signal, wherein the sensed image output is utilized for estimating an image displacement of the optical mouse apparatus. The processing unit is coupled to the light source unit and the sensing unit, arranged for controlling the light source unit to emit the optical signal and determining a operation status of the optical mouse apparatus according to an image variation of at least a partial region of each of consecutive images of the sensed image output.

According to a second embodiment of the present invention, a method utilized for an optical mouse apparatus is disclosed. The method includes: emitting an optical signal, wherein the optical signal is emitted upon a surface, and then reflected to form an optical reflected signal; generating a sensed image output according to the optical reflected signal, wherein the sensed image output is utilized for generating an estimated image displacement; and determining a operation status of the optical mouse apparatus according to an image variation of at least a partial region of each of consecutive images of the sensed image output.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
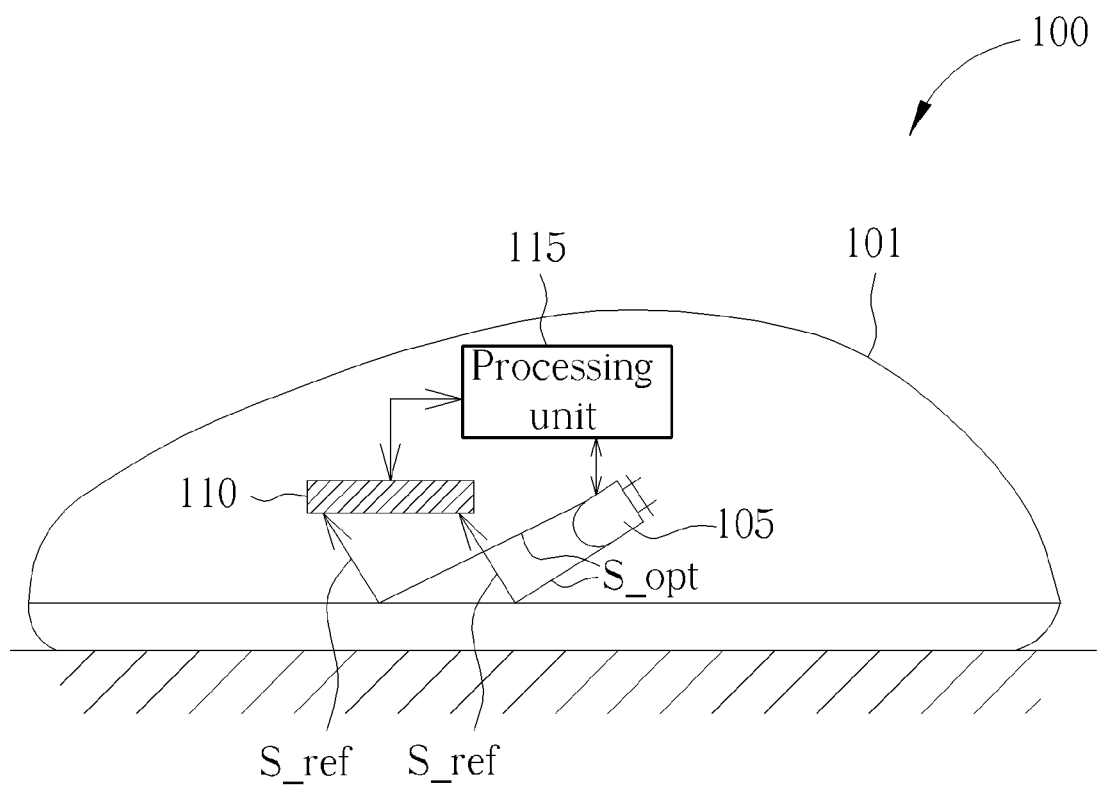
FIG. 1 is a block diagram illustrating an optical mouse apparatus according to a preferred embodiment of the present invention.

Please refer to FIG. 1, which is a block diagram illustrating an optical mouse apparatus 100 according to a preferred embodiment of the present invention. The optical mouse apparatus 100 includes a housing 101, a light source unit 105, a sensing unit 110, and a processing unit 115, wherein the light source unit 105 is arranged for generating and emitting an optical signal S_opt, which is emitted upon a surface and then reflected to form an optical reflected signal S_ref. The sensing unit 110 is arranged for generating a sensed image output according to the optical reflected signal S_ref, wherein the sensed image output is utilized for estimating an image displacement of the optical mouse apparatus 100. For instance, the optical mouse apparatus 100 is able to calculate the image displacement of the shadow of the cursor based on the position of the shadow of the cursor in a plurality of sensed images of the sensed image output, thereby estimating the cursor displacement. In addition, a plurality of sensed images of the sensed image output could also be provided to the processing unit 115 to act as reference used to determine the current operation status of the optical mouse apparatus 100. In this embodiment, the current operation status indicates whether the user has lifted up the optical mouse apparatus 100. To put it another way, the current operation status indicates that the optical mouse apparatus 100 is lifted up (i.e., the housing 101 leaves the surface), or the optical mouse apparatus 100 is still placed on the surface (i.e., the housing 101 does not leave the surface). The processing unit 115 is coupled to the light source unit 105 and the sensing unit 110, and is arranged for controlling the light source unit 105 to emit the optical signal S_opt upon the surface, and determining a operation status of the optical mouse apparatus 100 according to an image variation of at least the same partial region of each of consecutive images of the sensed image output; moreover, the processing 115 selectively determines whether to output the image displacement of the cursor or inhibit/lock the image displacement according to the current usage status. The image brightness may be expressed by a distribution of gray levels 0-255. Please note that the above-mentioned image displacement of the cursor could be calculated or estimated by using other circuit (s) or the processing unit 115.

In the embodiment of the present invention, the processing unit 115 utilizes the characteristic of the image variation of the image brightness of the sensed images to determine whether the optical mouse apparatus 100 is lifted up or not. Compared with the conventional techniques, the disclosed embodiment has high determination accuracy. When the optical mouse apparatus 100 is lifted up from the surface, determination is made based on the characteristic of the image variation of the image brightness of the sensed images. In this way, the condition where the optical mouse apparatus 100 is operated on a rough surface is precluded, thus avoiding misjudgment. Equivalent, due to the fact that the current operation status of the optical mouse apparatus 100 can be determined correctly, it is possible to inhibit/lock the image displacement of the cursor only when the optical mouse apparatus 100 is actually lifted up, while in other cases the image displacement of the cursor is still allowed to be outputted normally. This is capable of reducing/mitigating the jitter of the image displacement of the cursor on the screen.

Figure 2A:
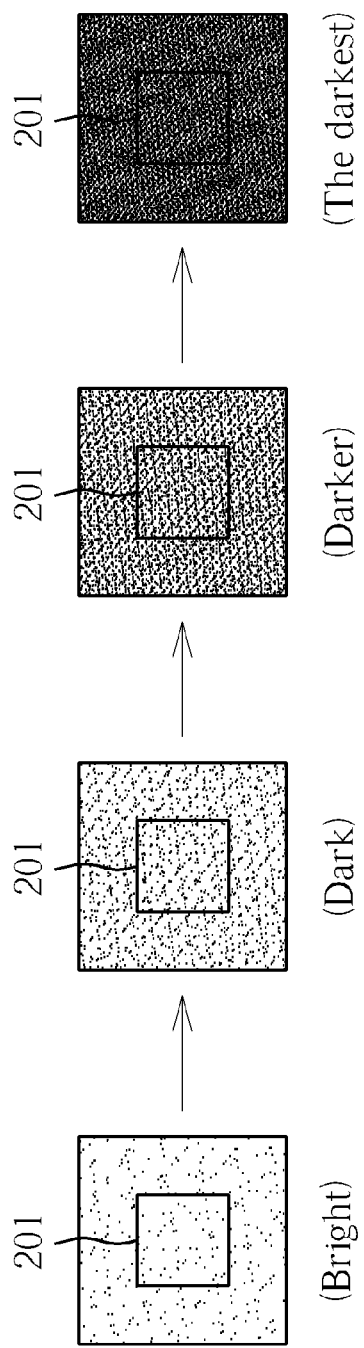
FIG. 2A is a diagram illustrating the brightness trend while the optical mouse apparatus shown in FIG. 1 is being lifted up from a surface.
Figure 2B:
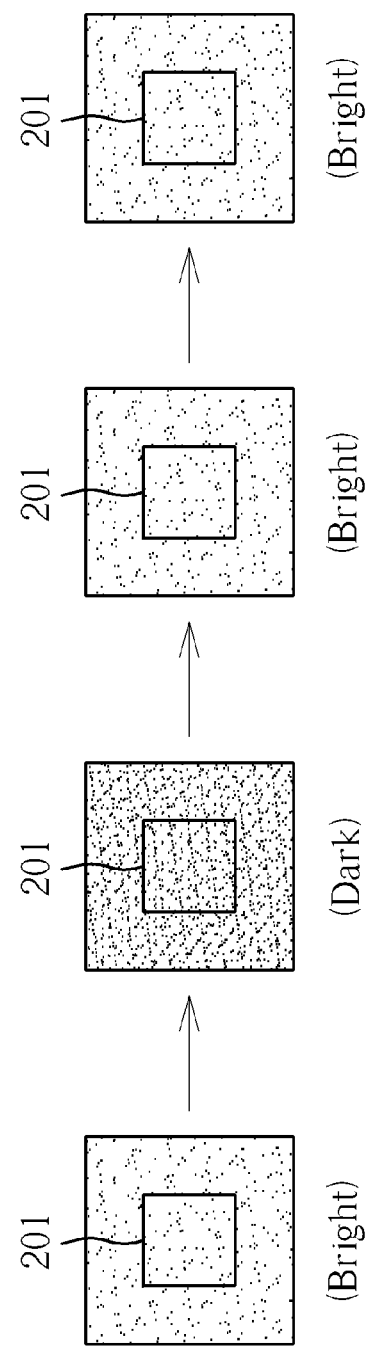
FIG. 2B is a diagram illustrating the brightness trend while the optical mouse apparatus shown in FIG. 1 is placed on a surface.

In the first embodiment, the processing unit 115 determines the current operation status of the optical mouse apparatus 100 in accordance with the brightness trend characteristic indicated by the image variation characteristic. Please refer to FIG. 2A in conjunction with FIG. 2B. FIG. 2A is a diagram illustrating an exemplary brightness trend while the optical mouse apparatus 100 shown in FIG. 1 is being lifted up from a surface. FIG. 2B is a diagram illustrating an exemplary brightness trend while the optical mouse apparatus 100 shown in FIG. 1 is placed on a surface. As can be seen in FIG. 2A, four sensed images, from left to right, correspond to different usage statuses of the optical mouse apparatus 100, that is, a status of the optical mouse apparatus 100 being placed on a surface, a status of the optical mouse apparatus 100 beginning to be lifted up, a status of the optical mouse apparatus 100 being lifted up halfway completely, and a status of the optical mouse apparatus 100 being lifted up completely. In FIG. 2A and FIG. 2B, the degree of brightness of the sensed image is indicated by the density of dots, wherein the image with the sparsest dot distribution represents the brightest one, while the image with the densest dot distribution represents the darkest one. When the optical mouse apparatus 100 is placed on a surface, the sensing unit 110 generates the brightest sensed image; on the contrary, when the optical mouse apparatus 100 is lifted up completely, the sensing unit 110 generates the darkest sensed image. In the example shown in FIG. 2A, the processing unit 115 receives these sensed images, from left to right, sequentially, and obtains or generates the image variation characteristic by analyzing the brightness of the received sensed images. In this embodiment, the processing unit 115 generates the image variation characteristic through analyzing the image brightness (e.g., the average brightness value) of a partial region (i.e. the region 201 shown in FIG. 2A). Further, the processing unit 115 could generate the image variation characteristic by analyzing the average brightness of the whole sensed image. When the processing unit 115 receives the sensed images, from left to right, sequentially, the average image brightness of the region 201 will be calculated immediately; therefore, after receiving a plurality of sensed images, the processing unit 115 will be able to derive the current image variation characteristic. If the image variation characteristic indicates that the image brightness of the same partial region decreases over time (as can be seen in FIG. 2A), the processing unit 115 will determine that the operation status of the optical mouse apparatus 100 changes from being placed on the surface to being lifted up from the surface, and the processing unit 115 will inhibit/lock the output of the image displacement of the cursor for reducing the jitter of cursor. Hence, for the image displayed on a screen, the cursor jitter on the screen will be eliminated by inhibiting the output of the estimated image displacement when the optical mouse apparatus 100 is lifted up into the air.

In addition, as can be seen in FIG. 2B, if the analyzed image variation characteristic indicates that the image brightness does not decrease over time but merely a small number of sensed images with darker brightness occasionally emerge, it will be determined the optical mouse apparatus 100 is not lifted up but probably used on a rough surface. Since the processing unit 115 determines that the current operation status of the optical mouse apparatus 100 according to the analyzed image variation characteristic, the case where the optical mouse apparatus 100 is operated on a rough surface can be precluded. Thus, according to the embodiment of the present invention, determining the operation status of the optical mouse apparatus 100 according to the image variation characteristic can effectively and accurately tell whether the optical mouse apparatus 100 is placed on a surface or lifted up into the air, which helps to decide whether to inhibit the output of the image displacement of the cursor for reducing the cursor jitter.

Figure 3A:
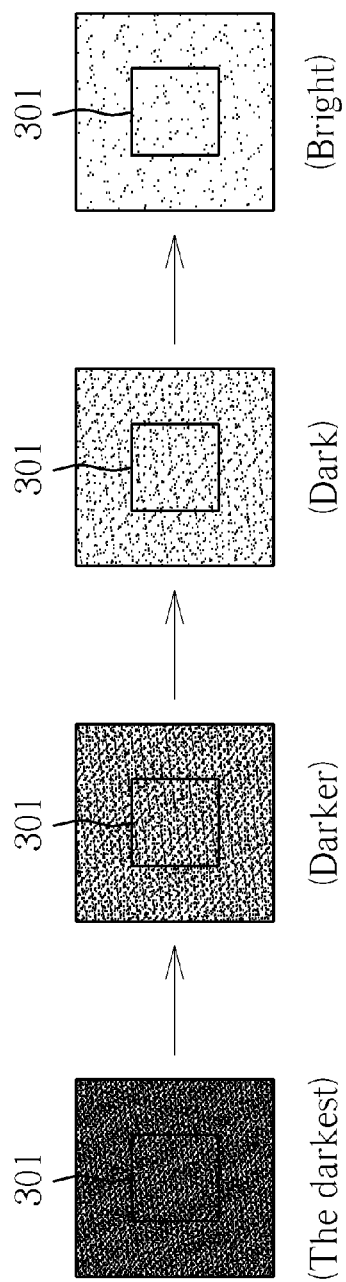
FIG. 3A is a diagram illustrating the brightness trend while the optical mouse apparatus shown in FIG. 1 is being placed on a surface from the air.
Figure 3B:
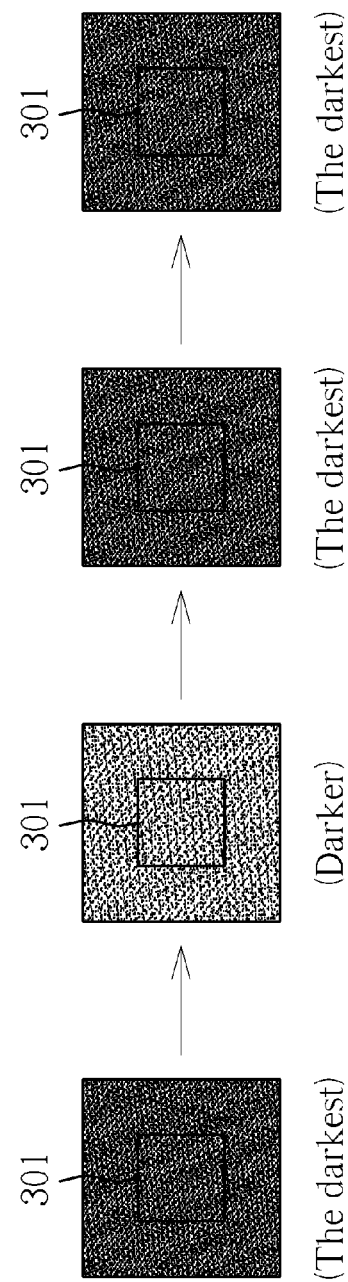
FIG. 3B is a diagram illustrating the brightness trend while the optical mouse apparatus shown in FIG. 1 is lifted up completely.

Please refer to FIG. 3A in conjunction with FIG. 3B. FIG. 3A is a diagram illustrating the brightness trend while the optical mouse apparatus 100 shown in FIG. 1 is completely lifted up and then placed onto a surface. FIG. 3B is a diagram illustrating the brightness trend while the optical mouse apparatus 100 shown in FIG. 1 is lifted up completely. As can be seen in FIG. 3A, the four sensed images, from left to right, correspond to different usage statuses of the optical mouse apparatus 100, that is, a status of the optical mouse apparatus 100 that is lifted up completely, a status of the optical mouse apparatus 100 beginning to be laid down on the surface, a status of the optical mouse apparatus 100 being laid down halfway, and a status of the optical mouse apparatus 100 that is placed on a surface completely. In FIG. 3A and FIG. 3B, the degree of brightness of the sensed image is indicated by the density of dots, wherein the image with the sparsest dot distribution represents the brightest one, while the image with the densest dot distribution represents the darkest one. When the optical mouse apparatus 100 is lifted up completely, the sensing unit 110 generates the darkest sensed image; on the contrary, when the optical mouse apparatus 100 is placed on a surface completely, the sensing unit 110 generates the brightest sensed image. In the example shown in FIG. 3A, the processing unit 115 receives these sensed images, from left to right, sequentially, and obtains or generates the image variation characteristic by analyzing the brightness of the received sensed images. In this embodiment, the processing unit 115 generates the image variation characteristic through analyzing the image brightness (e.g., the average brightness value) of a partial region (i.e. the region 301 shown in FIG. 3A). Further, the processing unit 115 could generate the image variation characteristic by analyzing the average brightness of the whole sensed image. When the processing unit 115 receives the sensed images, from left to right, sequentially, the average image brightness of the region 301 will be calculated immediately; therefore, after receiving a plurality of sensed images, the processing unit 115 will be able to derive the current image variation characteristic. If the image variation characteristic indicates that the image brightness of the same partial region increases over time (as can be seen in FIG. 3A), the processing unit 115 will determine that the operation status of the optical mouse apparatus 100 changes from being lifted up from the surface to being placed on the surface, and the processing unit 115 will output the image displacement of the cursor (in other words, the processing unit 115 switches from inhibiting the output to allowing the output). Hence, as to the image on a screen, when the optical mouse apparatus 100 is being laid down on a surface from the air, the cursor on the screen will be updated continuously because the output of the estimated image displacement is not inhibited.

In addition, as can be seen in FIG. 3B, if the analyzed image variation characteristic indicates the image brightness does not increase over time but merely a small number of sensed images with brighter brightness occasionally emerge, it will be determined that the optical mouse apparatus 100 is not placed on a surface but probably affected by the surrounding environment. Since the processing unit 115 determines that the current operation status of the optical mouse apparatus 100 according to the analyzed image variation characteristic, the case where the optical mouse apparatus 100 is affected by the surrounding environment can be precluded. Thus, according to the embodiment of the present invention, determining the operation status of the optical mouse apparatus 100 according to the image variation characteristic can effectively and accurately tell whether the optical mouse apparatus 100 is placed on a surface or lifted up into the air, which helps to decide whether to inhibit the output of the image displacement of the cursor and when to stop inhibiting the output of the image displacement of the cursor. In this way, jitter of the cursor on the screen is reduced/mitigated.

Moreover, in addition to the aforementioned method which determines the operation status of the optical mouse apparatus 100 according to the increasing or decreasing of the brightness indicated by the image variation characteristic, the processing unit 115 in other embodiments may employ another method which determines the operation status by referring to the actual image brightness of the sensed image and the above-mentioned image variation characteristic. Please refer to FIG. 2A again. In addition to analyzing the image variation characteristic, the processing unit 115 also determines if the actual image brightness of the sensed images falls in the appropriate brightness range sequentially. For instance, the processing unit 115 is configured to have two predetermined brightness thresholds, a high brightness threshold and a low brightness threshold. If the actual image brightness of the sensed image is higher than the high brightness threshold, it will be determined that the optical mouse apparatus 100 is placed on a surface; however, if the actual image brightness of the sensed image is lower than the low brightness threshold, it will be determined that the optical mouse apparatus 100 has been lifted up into the air. Therefore, the processing unit 115 verifies the analyzed image variation characteristic through examining whether the actual image brightness of the sensed images is higher than the high brightness threshold, between the two thresholds, and lower than the low brightness threshold, sequentially. If aforementioned two conditions are both met, then the processing unit 115 will determine that the optical mouse apparatus 100 is being lifted up. On the contrary, if none of these sensed images has the actual image brightness lower tan the low brightness threshold or between the two thresholds, then the processing unit 115 will determine that the optical mouse apparatus 100 may be operated on a rough surface, and thus does not determine that the optical mouse apparatus 100 is being lifted up. Therefore, the case where the optical mouse apparatus 100 may be operated on a rough surface can be precluded to thereby accurately determine the operation status of the optical mouse apparatus 100.

Moreover, the processing unit 115 can determine whether the optical mouse apparatus 100 is being placed on a surface by referring to the use of the actual image brightness of the sensed image and the above-mentioned image variation characteristic. Please refer to FIG. 3A again. In addition to analyzing the image variation characteristic, the processing unit 115 also determines if the actual image brightness of the sensed images falls in the appropriated brightness range sequentially. For instance, the processing unit 115 verifies the analyzed image variation characteristic through examining whether the actual image brightness of the sensed images is lower than the low brightness threshold, between the two thresholds, and higher than the high brightness threshold, sequentially. If the aforementioned two conditions are both met, then the processing unit 115 will determine that the optical mouse apparatus 100 is being placed on a surface. On the contrary, if none of these sensed images has the actual image brightness higher than the high brightness threshold or between the two thresholds, then the processing unit 115 will determine that the optical mouse apparatus 100 may still be lifted up into the air, and thus does not determine that the optical mouse apparatus 100 is being placed on a surface. Therefore, it can accurately determine the operation status of the optical mouse apparatus 100.

Furthermore, in the second embodiment, the image variation characteristic analyzed and generated by the processing unit 115 includes the trend of a moving average of the actual image brightness. For instance, the processing unit 115 calculates the moving average of the actual image brightness of the sensed images and determines the current operation status of the optical mouse apparatus 100 according to the image brightness trend characteristic corresponding to the moving average. For example, the processing unit 115 calculates the moving average of the actual brightness of the latest three sensed images while performing the image variation characteristic analysis, and compares the brightness moving average with a brightness threshold. If the comparison result indicates that the brightness moving average is lower than the brightness threshold, the processing unit 115 will determine that the user is lifting up the optical mouse apparatus 100, and inhibit or lock the output displacement of the mouse courser to reduce jitter of the cursor on the screen. On the contrary, if the comparison result indicates that the brightness moving average is higher than the brightness threshold, the processing unit 115 will determine that the user is placing the optical mouse apparatus 100 on a surface, and stop inhibiting or locking the output displacement of the mouse courser (i.e., the processing unit 115 outputs the mouse cursor displacement instead). By using the moving average of the brightness, the processing unit 115 could also preclude the misjudgment. For instance, if the moving average of the actual brightness of the latest three sensed images is higher than the brightness threshold, this indicates that the optical mouse apparatus 100 is currently placed on a surface. If the brightness of a certain sensed image is darker than others due to the rough surface, it will not excessively influence the calculation result of the moving average of the actual brightness since the calculated brightness is based on the moving average concept. That is, the image variation characteristic represented by the moving average will not be affected. Therefore, the moving average of the brightness calculated by the processing unit 115 will still be higher than the brightness threshold, and the processing unit 115 will not erroneously determine that the user is lifting up the optical mouse apparatus 100 at this time. Therefore, using the mechanism of calculating the moving average of the brightness helps to preclude the misjudgment and avoid the wrong displacement lock of the mouse cursor.

Furthermore, in the third embodiment, the brightness moving averages calculated based on different lengths could also be utilized for determining the current operation status of the optical mouse apparatus 100. For instance, the image variation characteristic analyzed and generated by the processing unit 115 includes the trend of two moving averages of the actual image brightness, where the moving averages are calculated based on two different lengths. For example, the processing unit 115 calculates a short-term moving average and a long-term moving average of the actual brightness of the sensed images while performing the image variation characteristic analysis, and determines the current operation status according to the image brightness trend characteristic represented by the long-term and short-term moving averages. For example, the processing unit 115 could calculate the moving average of the actual brightness of the latest five sensed images as the short-term moving average, calculate the moving average of the actual brightness of the latest ten sensed images as the short-term moving average, and compare the short-term moving average and the long-term moving average. If the comparison result indicates the short-term moving average is lower than the long-term moving average, the processing unit 115 will determine that the user is lifting up the optical mouse apparatus 100, and inhibit or lock the output displacement of the mouse courser to thereby reduce jitter of the cursor on the screen. On the contrary, if the comparison result indicates that the short-term moving average is larger than the long-term moving average, the processing unit 115 will determine that the user is placing the optical mouse apparatus 100 on a surface, and stop inhibiting or locking the output displacement of the mouse courser (i.e., the processing unit 115 outputs the mouse cursor displacement instead). By using the moving averages calculated based on different lengths, the processing unit 115 could also preclude the misjudgment. For instance, if the short-term moving average is larger than the long-term moving average, it will be determined that the optical mouse apparatus 100 is currently placed on a surface. If the brightness of a certain sensed image is darker than others due to the rough surface, it will not excessively influence the calculation results of the short-term and long-term moving averages of the actual brightness since the calculated brightness is based on the moving average concept. That is, the image variation characteristic represented by the short-term and long-term moving averages will not be affected. Therefore, the short-term moving average calculated by the processing unit 115 will still be higher than the long-term moving average, and the processing unit 115 will not erroneously determine that the user is lifting up the optical mouse apparatus 100 at this time. Therefore, using the mechanism of calculating the moving averages based on different lengths helps to preclude misjudgment and avoid the wrong displacement lock of the mouse cursor.

Figure 4:
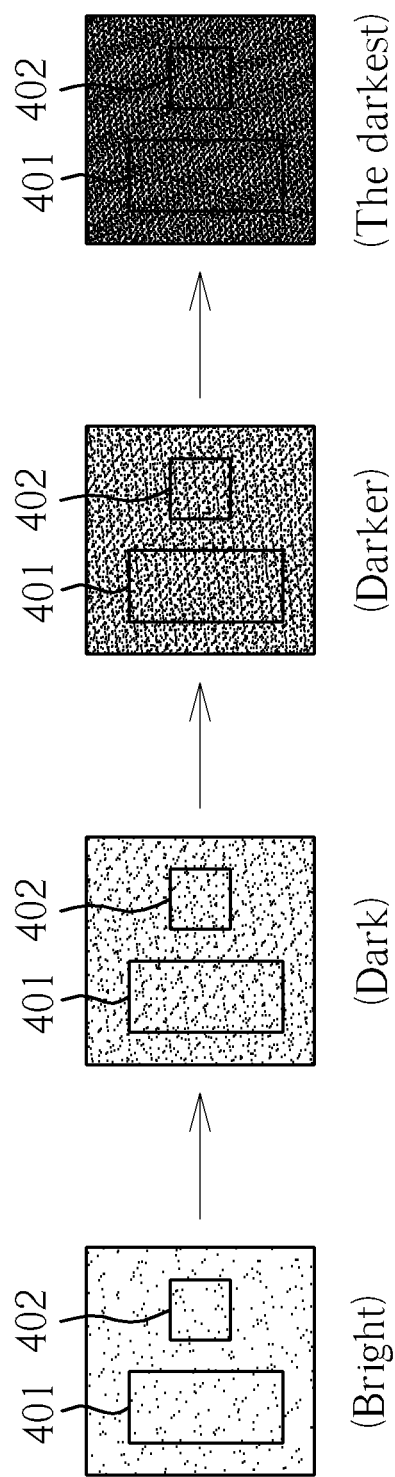
FIG. 4 is a diagram illustrating an example that the optical mouse apparatus shown in FIG. 1 uses the image variation characteristic of the image brightness of two partial regions of the sensed images to determine the current usage status.

Furthermore, in the fourth embodiment, the processing unit 115 could determine the current operation status of the optical mouse apparatus 100 according to the image variation characteristic of the image brightness of a plurality of partial regions of each of consecutive sensed images, and refer to the determined current operation status of the optical mouse apparatus 100 to determine whether to output or lock the mouse cursor displacement. Please refer to FIG. 4, which is a diagram illustrating an example that the optical mouse apparatus 100 shown in FIG. 1 uses the image variation characteristic of the image brightness of two partial regions of sensed images to determine the current usage status. As can be seen in FIG. 4, the first partial region is marked as 401, and the second partial region is marked as 402, determining the current operation status of the optical mouse apparatus 100 by using the image variation characteristic of the image brightness of the regions 401 and 402 respectively can help the processing unit 115 to preclude the misjudgment and avoid the wrong displacement lock of the mouse cursor. Please note that the plurality of partial regions is not limited to two regions. Using the image brightness trend characteristic of three or more partial regions to determine the current operation status of the optical mouse apparatus 100 also obeys the technical spirit of the present invention. In addition, for strengthening the effect of suppressing the mouse cursor jitter, if the image brightness trend of any one of the above-mentioned partial regions indicates that the brightness is decreasing, the average value of the brightness is lower than the brightness threshold, or the short-term moving average is lower than the long-term moving average, the processing unit 115 will immediately determine that the optical mouse apparatus 100 is being lifted up into the air and immediately inhibit/lock the output of the mouse cursor.

Moreover, it should be noted that the image variation characteristic analyzed by the above-mentioned processing unit 115 is generated by using the image brightness of at least two consecutive sensed images; however, for improving the accuracy of the analyzed image variation, it could be altered to use the image brightness of at least three consecutive sensed images or even at least ten consecutive sensed images. In other words, the spirit of the present invention is to use the image brightness trend characteristic of consecutive sensed images for determining the current operation status of the optical mouse apparatus, and determine whether to inhibit/lock the output of the mouse cursor according to the determined current operation status of the optical mouse apparatus. Therefore, no matter how many consecutive sensed images are used, these exemplary designs all belong to the scope of the present invention.

Furthermore, in the fifth embodiment, an image variation characteristic of the image brightness of consecutive sensed images can also indicate the trend of the corresponding exposure value. Therefore, the processing unit 115 can determine whether the current operation status of the optical mouse apparatus 100 is being lifted up according to an image exposure trend of the image brightness of consecutive sensed images. In detail, if the optical mouse apparatus 100 further has an aperture (not shown in FIG. 1) which corresponds to the image brightness of the sensed image and is utilized to increase the exposure value while the brightness of the sensed image is not high enough, thereby increasing the accuracy of the displacement estimation. In practice, if the optical mouse apparatus 100 is being lifted up into the air, then the image brightness trend characteristic of the consecutive sensed images will indicate a decreasing trend, and the aperture will continuously increase the exposure value according to the optical mouse apparatus 100, correspondingly. Hence, if the image exposure trend of the image brightness of the consecutive sensed image increases and reaches the maximum exposure value, it implies that the optical mouse apparatus 100 is being lifting up into the air. Therefore, the processing unit 115 will determine the current operation status of the optical mouse apparatus 100 by further referring to the image exposure trend of the consecutive sensed images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical mouse apparatus, comprising:
   a light source unit, arranged for generating and emitting an optical signal, wherein the optical signal is emitted upon a surface and then reflected to form an optical reflected signal;
   a sensing unit, arranged for generating a sensed image output according to the optical reflected signal, wherein the sensed image output is utilized for estimating an image displacement of the optical mouse apparatus; and
   a processing unit, coupled to the light source unit and the sensing unit, the processing unit arranged for controlling the light source unit to emit the optical signal and determining an operation status of the optical mouse apparatus according to an image variation of at least a partial region of each of a plurality of consecutive images of the sensed image output;
   wherein the processing circuit configures a first predetermined brightness threshold and a second predetermined brightness threshold that is lower than the first predetermined brightness threshold; the processing circuit determines that the optical mouse apparatus is being placed on the surface when detecting that an actual image brightness of the sensed image sequentially becomes lower than the second predetermined brightness threshold, between the first and second predetermined brightness thresholds, and higher than the first predetermined brightness threshold; and, the processing circuit determines that the optical mouse apparatus is being lifted in to air when detecting that the actual image brightness of the sensed image sequentially becomes higher than the first predetermined brightness threshold, between the first and second predetermined brightness thresholds, and lower than the second predetermined brightness threshold and further detecting that an image exposure trend of the actual image brightness increases.

2. The optical mouse apparatus of claim 1, wherein the processing unit determines whether the optical mouse apparatus is lifted up from the surface or is placed on the surface according to the image variation.

3. The optical mouse apparatus of claim 1, wherein the processing unit refers to the image variation to determine whether to output the estimated image displacement.

4. The optical mouse apparatus of claim 1, wherein the processing unit generates the image variation by analyzing image brightness of at least a same partial region of each of at least three consecutive images of the sensed image output.

5. The optical mouse apparatus of claim 4, wherein when the image variation indicates that the image brightness of the same partial region decreases over time, the processing unit determines that the operation status of the optical mouse apparatus changes from being placed on the surface to being lifted up from the surface, and inhibits an output of the estimated image displacement.

6. The optical mouse apparatus of claim 4, wherein when the image variation indicates that the image brightness of the same partial region increases over time, the processing unit determines that the operation status of the optical mouse apparatus changes from being lifted up from the surface to being placed on the surface, and outputs the estimated image displacement.

7. The optical mouse apparatus of claim 4, wherein the image processing unit determines the image variation through calculating a moving average of the image brightness of the same partial range, compares the moving average with a brightness threshold to determine the operation status of the optical mouse apparatus, and determines whether to output the estimated image displacement according to the operation status of the optical mouse apparatus.

8. The optical mouse apparatus of claim 4, wherein the image processing unit determines the image variation through calculating a short-term moving average and a long-term moving average of the image brightness of the same partial range, compares the short-term moving average with the long-term moving average to determine the operation status of the optical mouse apparatus, and determines whether to output the estimated image displacement according to the operation status of the optical mouse apparatus.

9. The optical mouse apparatus of claim 4, wherein the image processing unit generates a first image variation and a second image variation by respectively analyzing the image brightness of a first region and a second region of each of at least three consecutive images of the sensed image output; when either of the first image variation and the second image variation indicates that the image brightness decreases over time, the processing unit determines that the operation status of the optical mouse apparatus changes from being placed on the surface to being lifted up from the surface, and inhibits an output of the estimated image displacement.

10. The optical mouse apparatus of claim 1, wherein the image processing unit generates the image variation by analyzing a trend of an image exposure value corresponding to the image brightness of at least a same partial region of each of at least three consecutive images of the sensed image output.

11. A method employed in an optical mouse apparatus, comprising:
    emitting an optical signal, wherein the optical signal is emitted upon a surface, and reflected to form an optical reflected signal;
    generating a sensed image output according to the optical reflected signal, wherein the sensed image output is utilized for generating an estimated image displacement; and
    determining an operation status of the optical mouse apparatus according to an image variation of at least a partial region of each of a plurality of consecutive images of the sensed image output, and the step of determining the operation status comprises:
       configuring a first predetermined brightness threshold and a second predetermined brightness threshold that is lower than the first predetermined brightness threshold;
       determining that the optical mouse apparatus is being placed on the surface when detecting that an actual image brightness of the sensed image sequentially becomes lower than the second predetermined brightness threshold, between the first and second predetermined brightness thresholds, and higher than the first predetermined brightness threshold; and determining that the optical mouse apparatus is being lifted in to air when detecting that the actual image brightness of the sensed image sequentially becomes higher than the first predetermined brightness threshold, between the first and second predetermined brightness thresholds, and lower than the second predetermined brightness threshold and further detecting that an image exposure trend of the actual image brightness increases.

12. The method of claim 11, wherein the step of determining the operation status of the optical mouse apparatus comprises:

determining whether the optical mouse apparatus is lifted up from the surface or is placed on the surface according to the image variation.

13. The method of claim 11, further comprising:
determining whether to output the estimated image displacement according to the image variation.

14. The method of claim 11, further comprising:
generating the image variation by analyzing image brightness of at least a same partial region of each of at least three consecutive images of the sensed image output.

15. The method of claim 14, wherein the step of determining the operation status of the optical mouse apparatus comprises:

when the image variation indicates that the image brightness of the same partial region decreases over time, determining that the operation status of the optical mouse apparatus changes from being placed on the surface to being lifted up from the surface, and inhibiting an output of the estimated image displacement.

16. The method of claim 14, wherein the step of determining the operation status of the optical mouse apparatus comprises:

when the image variation indicates that the image brightness of the same partial region increases over time, determining that the operation status of the optical mouse apparatus changes from being lifted up from the surface to being placed on the surface, and outputting the estimated image displacement.

17. The method of claim 14, wherein the step of determining the operation status of the optical mouse apparatus comprises:

determining the image variation through calculating a moving average of the image brightness of the same partial range; and comparing the moving average with a brightness threshold to determine the operation status of the optical mouse apparatus, and determines whether to output the estimated image displacement according to the operation status of the optical mouse apparatus.

18. The method of claim 14, wherein the step of determining the operation status of the optical mouse apparatus comprises:

determining the image variation through calculating a short-term moving average and a long-term moving average of the image brightness of the same partial range; and comparing the short-term moving average with the long-term moving average to determine the operation status of the optical mouse apparatus, and determining whether to output the estimated image displacement according to the operation status of the optical mouse apparatus.

19. The method of claim 14, wherein the step of determining the operation status of the optical mouse apparatus comprises:

generating a first image variation and a second image variation by respectively analyzing the image brightness of a first region and a second region of each of at least three consecutive images of the sensed images; and if either of the first image variation and the second image variation indicates that the image brightness decreases over time, determining that the operation status of the optical mouse apparatus changes from being placed on the surface to being lifted up from the surface, and inhibiting an output of the estimated image displacement.

20. The method of claim 11, further comprising:
generating the image variation by analyzing a trend of an image exposure value corresponding to the image brightness of at least a same partial region of each of at least three consecutive images of the sensed image output.

* * * * *